United States Patent
Soubbotin

(10) Patent No.: US 9,218,414 B2
(45) Date of Patent: *Dec. 22, 2015

(54) SYSTEM, METHOD, AND USER INTERFACE FOR A SEARCH ENGINE BASED ON MULTI-DOCUMENT SUMMARIZATION

(76) Inventor: Dmitri Soubbotin, Brooklyn, NY (US)

( * ) Notice: Subject to any disclaimer, the term of this patent is extended or adjusted under 35 U.S.C. 154(b) by 73 days.

This patent is subject to a terminal disclaimer.

(21) Appl. No.: 13/539,098

(22) Filed: Jun. 29, 2012

(65) Prior Publication Data

US 2012/0278300 A1     Nov. 1, 2012

Related U.S. Application Data

(63) Continuation-in-part of application No. 12/023,014, filed on Jan. 30, 2008, now Pat. No. 8,239,358.

(60) Provisional application No. 60/888,515, filed on Feb. 6, 2007.

(51) Int. Cl.
    G06F 7/00      (2006.01)
    G06F 17/30     (2006.01)

(52) U.S. Cl.
    CPC .... *G06F 17/30719* (2013.01); *G06F 17/30696* (2013.01)

(58) Field of Classification Search
    None
    See application file for complete search history.

(56) References Cited

U.S. PATENT DOCUMENTS

| | | | |
|---|---|---|---|
| 5,623,652 A * | 4/1997 | Vora et al. | 707/742 |
| 7,707,220 B2 * | 4/2010 | Bonabeau et al. | 707/758 |
| 8,271,495 B1 * | 9/2012 | Skrenta et al. | 707/738 |
| 8,271,502 B2 * | 9/2012 | Svore et al. | 707/748 |
| 8,391,618 B1 * | 3/2013 | Chuang et al. | 382/224 |
| 2005/0203970 A1 * | 9/2005 | McKeown et al. | 707/203 |
| 2007/0106653 A1 * | 5/2007 | Sun | 707/4 |
| 2007/0136680 A1 * | 6/2007 | Skrenta | 715/780 |
| 2008/0243820 A1 * | 10/2008 | Chang et al. | 707/5 |

* cited by examiner

*Primary Examiner* — Augustine K Obisesan
*Assistant Examiner* — David T Brooks
(74) *Attorney, Agent, or Firm* — Ariel S. Bentolila; Bay Area IP Group LLC

(57) ABSTRACT

A method for searching multiple documents on a computer system includes steps for sending a query to a system core where the query is passed to a search component for searching the documents. The system core in turn receives results from the search component indicating related documents to the query and passes to a summarization component a specified number of the results. The summarization component processes related documents corresponding to the specified number of results to produce a multi-document summary. The system core receives the summary from the summarization component. The multi-document summary is received from the system core.

18 Claims, 6 Drawing Sheets

SYSTEM, METHOD, AND USER INTERFACE FOR A SEARCH ENGINE BASED ON MULTI-DOCUMENT SUMMARIZATION

CROSS-REFERENCE TO RELATED APPLICATIONS

The present continuation-in-part patent application claims priority benefit of the U.S. patent application Ser. No. 12/023,014 entitled "System, Method, and User Interface for a Search Engine Based on Multi-Document Summarization", filed on 30-Jan.-2008 now U.S. Pat. No. 8,239,358 under 35 USC 111(a), which in turn claims priority benefit of the U.S. provisional application for patent Ser. No. 60/888,515 filed on Feb. 6, 2007 under 35 U.S.C. 119(e); both of which are hereby incorporated by reference for all purposes to the extent that such subject matter is not inconsistent herewith or limiting hereof.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to search technology. More particularly, the invention relates to mechanisms of interaction between users and search engines and a combination of search technology with multi-document text summarization technology.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. It is believed that current Internet search methods generally return a large amount of Web pages that the user typically has to go through in order to find the information he is looking for. When the user submits a query to a search engine, the search engine often returns a list of links to Web pages that are deemed relevant to the user's query. Unless the user has a very specific query, he is generally presented with many pages, each of which the user may need to open and read separately to access the information. One may expect that additional difficulty lies in the fact that, with numerous search results, the user may be dealing with multiple authorities on the subject, which are often contradictory and may target different user audiences. Sometimes the contents of a page found by a search engine is irrelevant to the user's query altogether. In general, the user may spend a considerable time before finding satisfactory results.

Even after going through numerous pages, the user is not guaranteed to find the information sought or to get an answer for the question the user has in mind. Using current methods, the levels of user satisfaction with search results are low, even for popular search engines. Similar issues with search can occur on the Intranet, on an enterprise network, on a standalone computer, or when searching from a mobile communication device.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
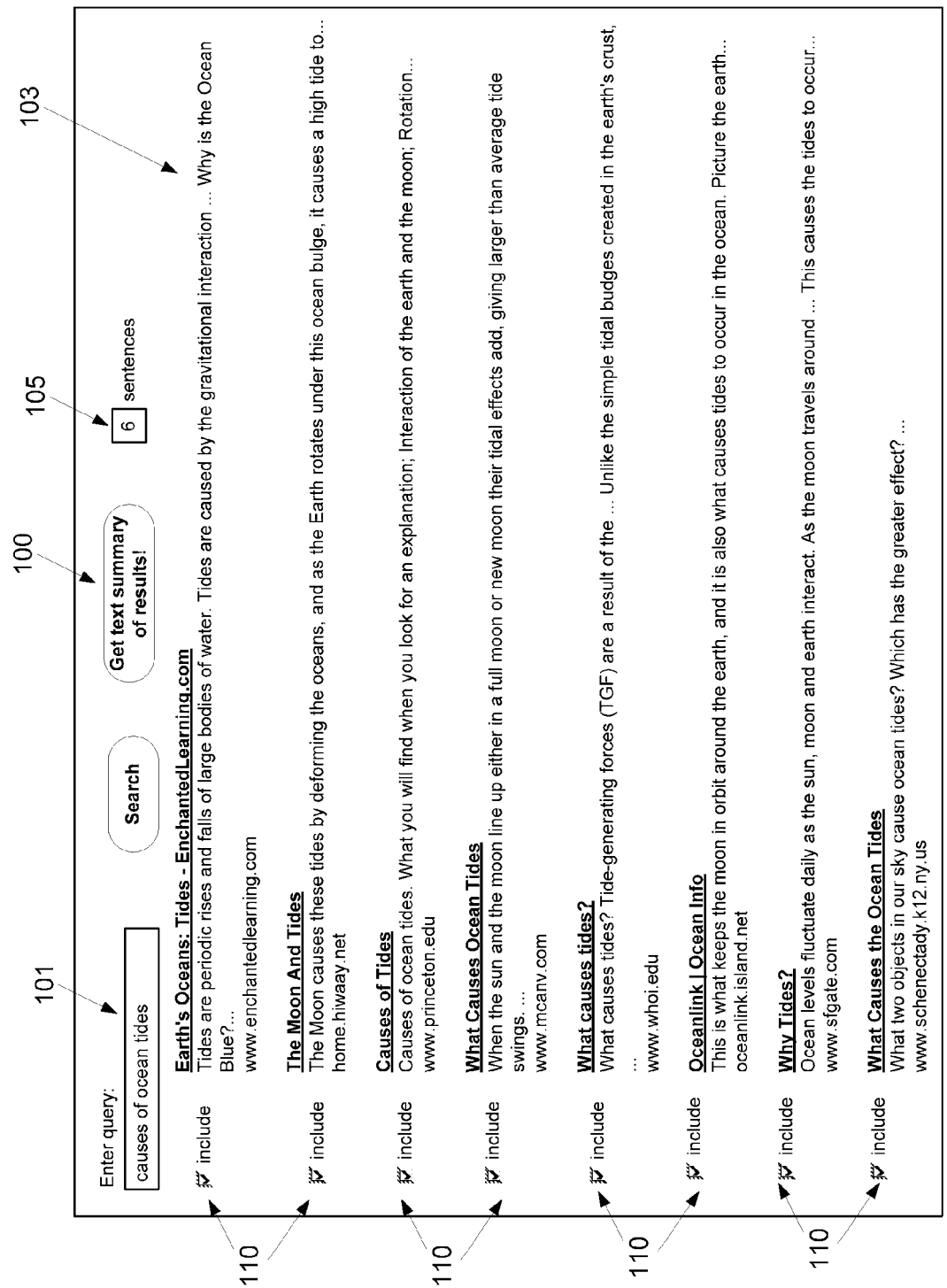
FIG. 1 illustrates an exemplary search results' page from an Internet search engine with an addition of a summary request button, in accordance with an embodiment of the present invention.

Unless otherwise indicated illustrations in the figures are not necessarily drawn to scale.

DETAILED DESCRIPTION OF THE PREFERRED EMBODIMENTS

Embodiments of the present invention are best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present application or of any further application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" may refer to prescribed rules to operate a computer. Examples of software may include: code segments in one or more computer-readable languages; graphical and or/textual instructions; applets; pre-compiled code; interpreted code; compiled code; and computer programs.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash memory; a memory chip; and/or other types of media that can store machine-readable instructions thereon.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

A non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; however, the non-transitory computer readable medium does not include a pure transitory signal per se.

Preferred embodiments of the present invention provide a new type of search result, in the form of an automatically generated text summary of substantially relevant search results. Within the summary, each sentence or text fragment has one or more references such as, but not limited to, a bibliographical reference or web address to the Web page(s) from which the text fragment was extracted. In some embodiments, the summary constitutes a digest on the topic specified by the user's query, extracting and blending together significant and relevant aspects of the results. Ideally, the user's query is satisfied, and the user does not need to navigate individual sources; however, in some embodiments the user is able to navigate these individual sources if desired. Preferred embodiments are implemented for Internet searches; however, some embodiments may be implemented to address search issues in other locations such as, but not limited to, the Intranet, an enterprise network, a standalone computer, when searching from a mobile communication device, etc. In preferred embodiments, the graphical user interface (GUI) is in the form of a button on the main search engine page and/or on the search engine results page with a command to display a text summary of results. Once the user clicks this button, the summary is produced and displayed for the user.

Preferred embodiments of the present invention comprise the following components: search means, a multi-document summarization engine and a software program. A system implementing these components may have a human interface or an application programming interface (API). The search means may be a search engine, meta-search engine, vertical search engine, or other means of searching that accepts the user's query, matches the query against a set of documents in a search engine index, and returns a list of matching search results. The search engine may be proprietary or commercially available. Depending on the particular embodiment, the search engine may be on the Internet, the Intranet, an enterprise network, a local area network (LAN), or a standalone computer or server. In preferred embodiments, the multi-document summarization engine analyzes the search results returned by the search engine, and produces a text summary of the results. Those skilled in the art will recognize, in accordance with the present teachings, that there are a variety of algorithms of multi-document summarization that may be used in embodiments of the present invention. The software program in preferred embodiments integrates the search engine, the summarization engine, and user interface actions such as, but not limited to, buttons to request the summary and to display the summary, save buttons, etc. This software program is herein referred to as the system core. Those skilled in the art will recognize, in accordance with the present teachings, that the exact mechanism for the implementation of the system core can vary, as long as the components are integrated in accordance with embodiments of the present invention.

The summary of results may satisfy the user's query fully or partially depending on the particular embodiment or system settings. The summary obtained from preferred embodiments may contain answers that the user was looking for, or at least give the user a good overview of the information contained in the document set. From the summary, the user can see which of the documents are better suited to his query, and may navigate to those documents directly from the summary.

Multi-document summarization systems are known to those skilled in the art. There is a great variety of algorithms used by different systems, targeting various domains of content and producing different quality of summaries. In general, a multi-document summarization system reads each document in the set of documents to summarize, analyzes the syntax and semantics of the documents, extracts key semantic concepts from the document, matches sentences or text fragments to the concepts being extracted, and constructs a summary comprising sentences or text fragments taken out of different documents in the set of documents to summarize. Those skilled in the art will recognize, in accordance with the present teachings, that the exact algorithm for summarization may vary greatly between various systems. For example, without limitation, in some embodiments the summarization algorithm may be based on natural language processing (NLP), analyzing the text of the search results, identifying key concepts or text fragments, and scoring these concepts or text fragments using various factors such as, but not limited to, relevance. In some embodiments the summarization algorithm may consider document structure, document format, metatags, or other types of data associated with the search results when identifying and scoring the key concepts or text fragments on relevance to the query. In the preferred embodiment, the key concepts and text fragments are organized in order of decreasing relevance; however, in alternate embodiments other factors such as, but not limited to, the position of a concept or text fragment on the source page, may also be taken into account. Other factors that the system may take into account when organizing the concepts and text fragments can be: predefined ranking of concepts; dynamically calculated ranking of concepts based on some criteria; ranking of the document (predefined or dynamically calculated); metadata associated with the concepts or documents; etc. A multi-document summarization system aims to produce a summary that looks like a coherent text to the user, or to give the user a good overview of the set of documents.

It is expected that the users' quality expectations from a summary of loosely-related documents of different nature, format, and target audience, as is also typical for the Internet, are generally lower than of a coherent, linear text written by a single author for a homogeneous audience. Hence for many types of queries, it is expected that users, particularly Internet users, will prefer a summary, even of an imperfect quality, to numerous links to Web pages. If the user is not satisfied by the summary, the preferred embodiment also provides conventional search results alongside the summary as another option. It is further understood that there are certain types of user queries where a summary is not sensible or not possible to produce. There are also types of queries where the user is not interested in getting a summary on the topic of the query, but rather wants to locate a particular Web page. These searches may not benefit from embodiments of the present invention. However, a great number of other types of searches will.

The preferred embodiment combines a search engine and a multi-document summarization engine in a way that is not currently available. Traditionally, search results have been perceived as a list of documents, or links to documents. As for summarization, there are some search systems that provide individual summaries of search results, which is different from multi-document summarization. However, the preferred embodiment of the present invention produces a summary of multiple search results, and treats the said summary as the main result of the user's search.

FIG. 1 illustrates an exemplary search results page from an Internet search engine with an addition of a summary request button 100, in accordance with an embodiment of the present invention. The page displays the user's query for "causes of ocean tides" in a query field 101, and a search results list 103, as links to documents that were found by the search engine while matching the query. In the present example, each search result in search results list 103 is displayed with a title, a URL to the location of the document, and a snippet of text that the search engine has associated with the result.

In the present embodiment, the page comprises three additions to the conventional display of search results, summary request button 100, a text fragments field 105, and a checkbox 110 for each search result in search results list 103. In the present embodiment, summary request button 100 is in the top right section of the screen and reads "Get text summary of results!". If the user clicks summary request button 100, a summary of the results displayed that are displayed on this page is generated by the system. In alternate embodiments, summary request buttons may have various designs with various different commands on the buttons and may be located in various places on the search page and on various pages of the search engine. For example, without limitation, a summary request button may be placed on the main page of the search engine as well as on the results page, in which case the step of displaying the conventional search results can be bypassed altogether, and the user can be taken directly to the summary. Text fragments field 105 indicates the number of text fragments or sentences to be included in the summary, and may be specified by the user in text fragments field 105. In this example, only six sentences are requested, in order for the display of the summary to fit on a single page. Checkboxes 110 are located next to each search result in search results list 103, enabling the user to specify which of the search results are to be included in the summary. In the present embodiment, a default setting includes all of the search results in the summary; however, alternate embodiments may have different default settings.

Figure 2:
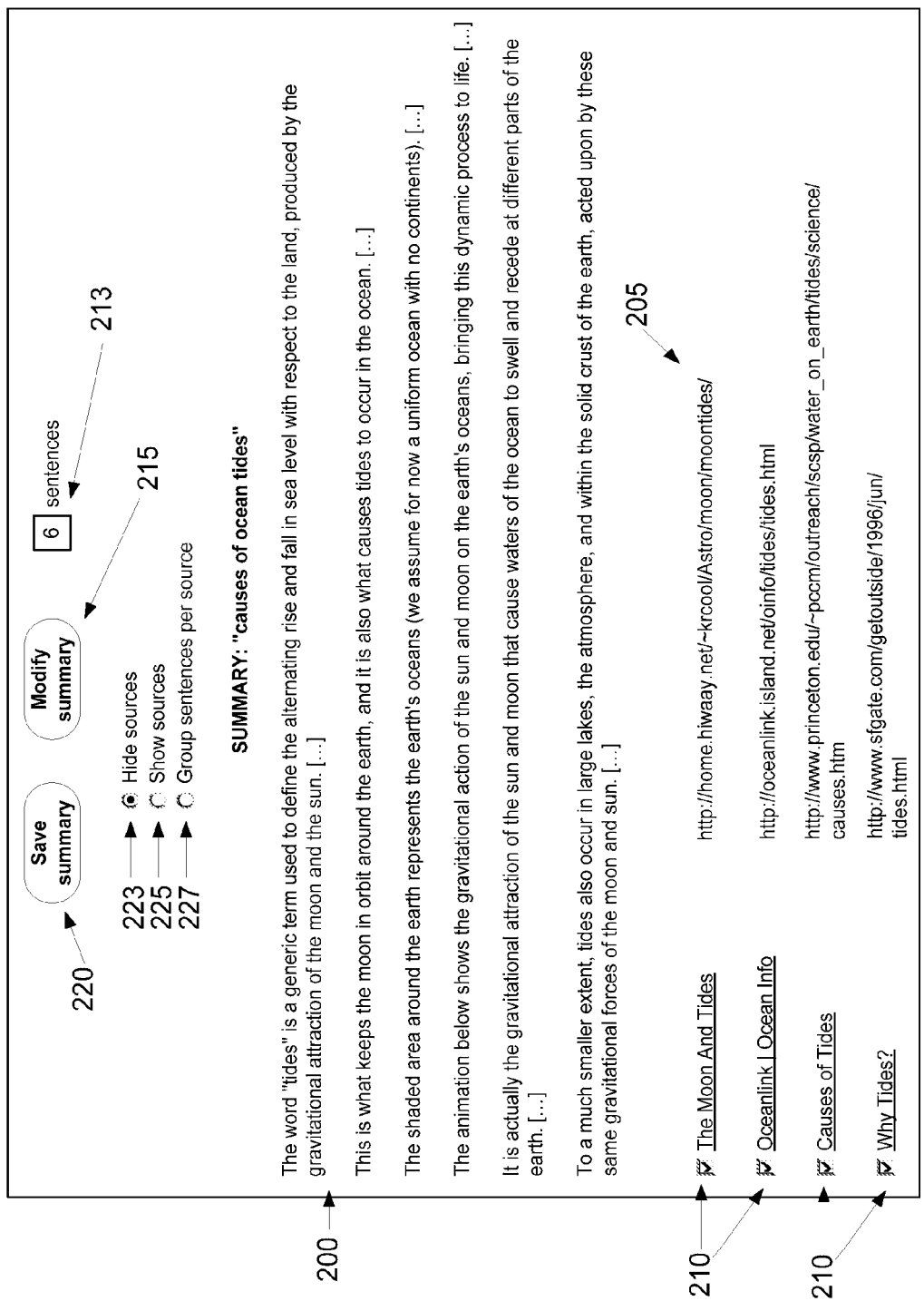
FIG. 2 illustrates an exemplary summary on a user's query, produced by a search system, in accordance with an embodiment of the present invention.

FIG. 2 illustrates an exemplary summary 200 on a user's query, produced by a search system, in accordance with an embodiment of the present invention. In the present embodiment, summary 200 is presented as a list of sentences; however, in alternate embodiments, the summary may be displayed in different formats such as, but not limited to, a list of semantic concepts, a cluster hierarchy, a tag cloud, etc. The sentences or text fragments within summary 200 originated from various sources, which are listed below the summary in a source list 205. The sources in source list 205 refer to the documents or Web pages found by the search engine as displayed in a conventional search result, shown by way of example in FIG. 1. The sources in source list 205 are clickable links, which can take the user to the corresponding Web page. Note that not all sources from the search shown in FIG. 1 are listed in source list 205. It is up to the multi-document summarization engine to decide which sources to include and in what order. Factors such as, but not limited to, the quality of the sources and the length of the summary as requested by the user may affect which sources are used in summary 200 and displayed in source list 205.

Also, the user has an option of removing some of the sources by deselecting checkboxes 210, which are next to each source in source list 205, and regenerating summary 200. When summary 200 is regenerated, the system only uses the sources from source list 205 that remain selected. The user may also change the number of sentences in summary 200 by changing the number in a text fragments field 213. In alternate embodiments the user may have different options for controlling the length of the summary for example, without limitation, a setting to set the overall number of pages, or a setting to set the length of the summary as a percentage of the total amount of text in the sources. In the present embodiment, a modify summary button 215 is used to regenerate summary 200. Also the user can click a save summary button 220 to save summary 200 in a file on a local or network drive. In an alternate embodiment, all original sources can be displayed, allowing the user to request a modified summary that would use the sources specified by the user.

A group of radio-buttons enabling the user to control the presentation of sources within summary 200 is presented. The setting displayed in the present example is a hide sources setting 223, which indicates that each sentence in summary 200 is not followed by a reference to its corresponding source. The present embodiment also comprises a show sources setting 225 and a group sentences per source setting 227. Show sources setting 225 displays the source of each sentence after the sentence within summary 200, as shown by way of example in FIG. 3, and group sentence per source setting 227 groups the sentences in summary 200 by source and lists this source after each group of sentences. Alternate embodiments may have various other features and settings for the user interface such as, but not limited to, a language setting for the query, a rating feature, a print feature, a save feature, a feature enabling users to share summaries, a comment feature, a voting feature, etc. Other user interface setting may include: allowing the user to refine the original query, for example by entering a different wording, or by specifying the concepts that would modify the topic of the query; turn on or off the display of relevance scores; marking some sentences in the summary for removal, and generating a summary without them. The text summary can also be overlayed with graphics, video, and other types of media for presentation purposes.

Figure 3:
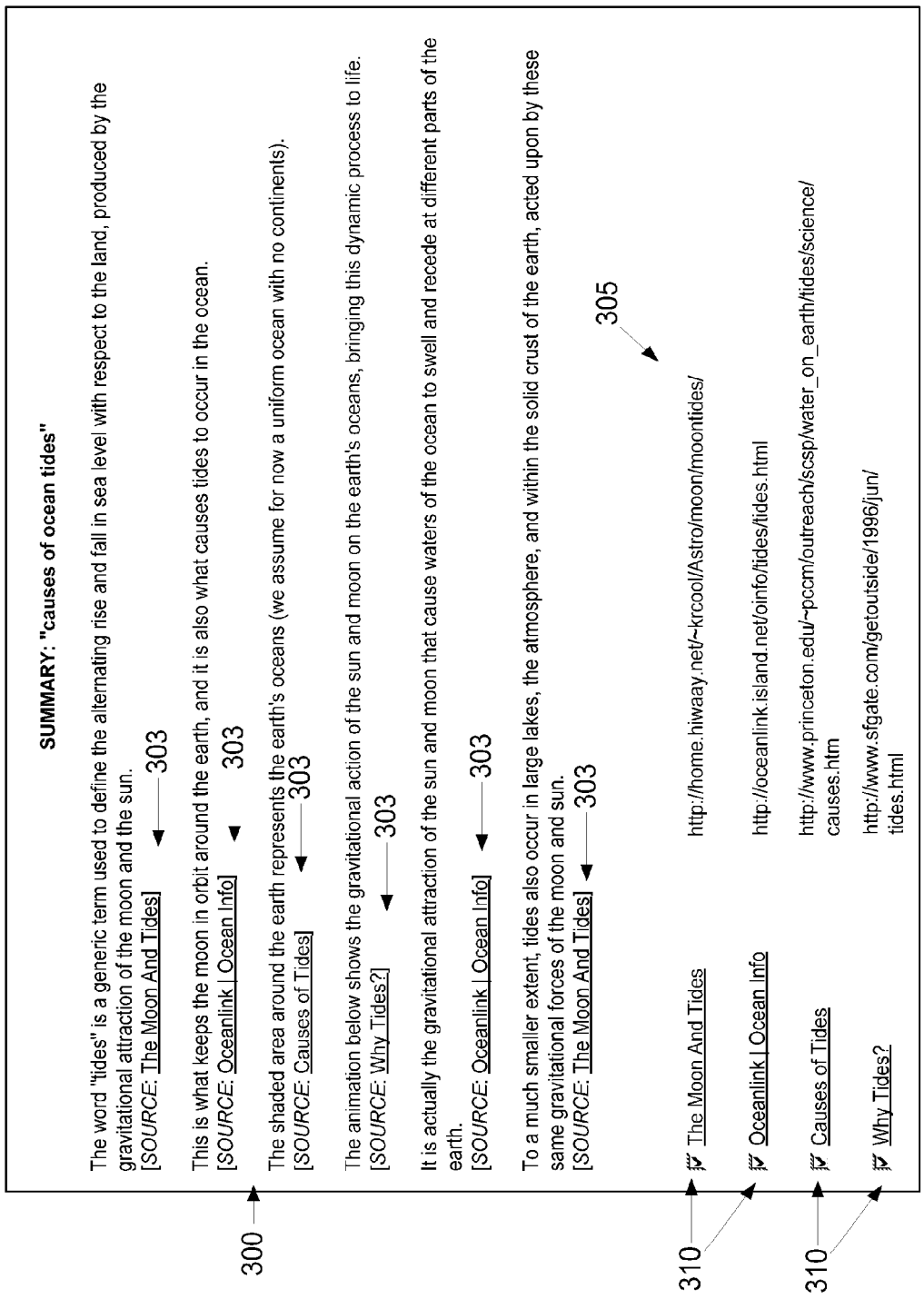
FIG. 3 illustrates an exemplary summary on a user's query, where each sentence or text fragment in the summary is followed by a reference to its source, in accordance with an embodiment of the present invention.

FIG. 3 illustrates an exemplary summary 300 on a user's query, where each sentence or text fragment in summary 300 is followed by a reference 303 to its source, in accordance with an embodiment of the present invention. This setting is defined by a show sources setting, as shown by way of example in FIG. 2. In the present embodiment, references 303 are listed as clickable URLs to the Web pages from which the text fragments are sourced, which can take the user to the corresponding Web page. The present embodiment also comprises a source list 305 and checkboxes 310 that enable the user to select or deselect the sources to be included in summary 300.

The fragments of text comprising summary 300 are ordered according to their semantics as opposed to their order on the source Web pages. Therefore, even though some text fragments are sourced from the same Web page, they are generally not sequentially presented in summary 300. The exact mechanism of ordering of text fragments is not specified by the present embodiment, however, the example illustrates that the system summarized a set of documents as a whole, as opposed to concatenating individual summaries. Furthermore some embodiments of the present invention may specify how to order the text fragments, for example, without limitation, alphabetically by source, by relevance, etc.

Figure 4:
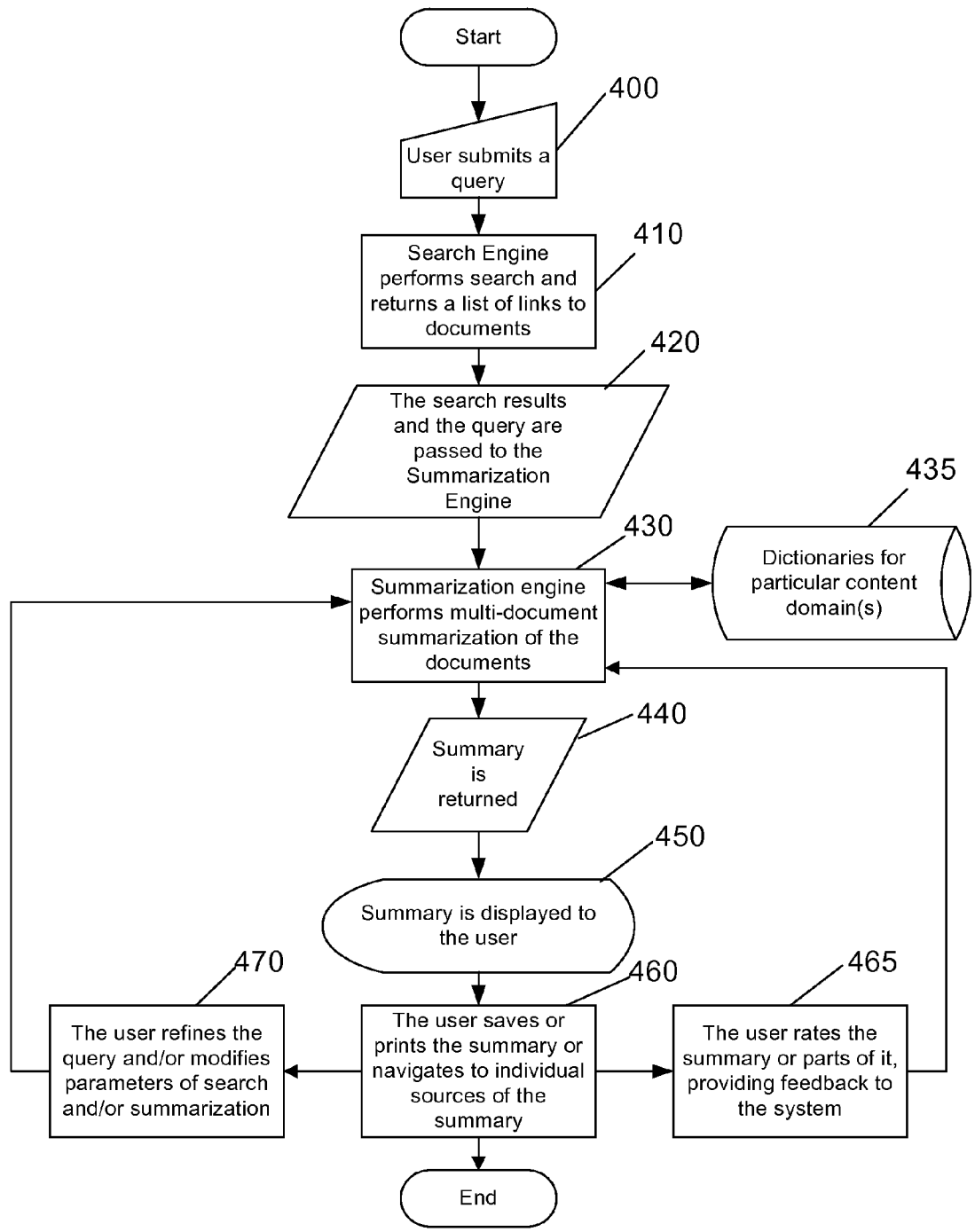
FIG. 4 is a flowchart illustrating an exemplary process for the interaction between a search engine and a summarization engine, in accordance with an embodiment of the present invention.

FIG. 4 is a flowchart illustrating an exemplary process for the interaction between a search engine and a summarization engine, in accordance with an embodiment of the present invention. The following steps are presented to describe the process according to the present embodiment. In step 400, a user submits a query to a search engine. In step 410 the search engine receives the query, locates matching documents in the search engine data store, and returns a list of links to the documents. The search results may be in various forms for example, without limitation, documents or files containing text or fragments of text. These documents may be in any format readable by the system, for example, without limitation, HTML, TXT, DOC, RTF, PPT, XLS, XML, etc. Also, the language of the text may be any language, and the language of the various documents in the results may be the same or different. In various embodiments the search results may originate from various sources such as, but not limited to, the Internet, an Intranet, an enterprise network, a LAN, a database or computer file generated by a computer program based on an algorithm, etc. In the present embodiment, the search results are received by a system core, which is a piece of software integrating other pieces of the present embodiment. In step 420 the system core passes the top links and the original user's query to a multi-document summarization engine. The number of links passed to the multi-document summarization engine may be specified by the user or configured internally. Furthermore, the language of the query and the documents may be specified to the multi-document summarization engine or automatically identified by the multi-document summarization engine, and the multi-document summarization engine may skip a document if the language is not recognized.

In step 430 the multi-document summarization engine receives the query and the links to the documents. Then, the multi-document summarization engine parses each individual document to extract key semantic concepts and corresponding text fragments or sentences and performs multi-document summarization of the documents based on the extracted concepts, producing a text summary representing a digest of the search results. The summary may comprise key semantic concepts, text fragments or sentences matching these concepts, or a combination of the two. The user query may be taken into account, to focus the summary on a particular topic using means such as, but not limited to, NLP or metadata to help determine relevance of the results. In the present embodiment, if the system is unable to use the query, for example, without limitation, if the query is unrecognized by the system, empty, or not passed to the system, the system generates a summary of key semantic concepts in the documents without focusing on a particular topic. In an alternate embodiment, if the system is unable to use the query, the system produces a summary based on a topic derived by the system that is based on predefined or built-in criteria or based on additional parameters. In other alternate embodiments, if the system is unable to use the query an error message may be sent to the user that may ask the user to change the query. A relevance score may be calculated for each concept or text fragment, and this relevance score may or may not be displayed to the user in the summary and may be used by the system for learning.

In the present embodiment, content dictionaries 435 comprising words, phrases or concepts related to a particular content domain may be used by the multi-document summarization engine. The words, phrases and concepts in content dictionaries 435 may be characteristic for particular information domains, or may be not pertinent to the content domain, enabling the multi-document summarization engine to adjust its algorithm to better suit the particular information domain. Rules that help the system to understand and classify the content may be used. Content dictionaries 435 may be static, dynamically populated by users or administrators, or accumulated by the system through self-learning features of the system. Other information that may be used by the self-learning features includes, without limitation, feedback from users or otherwise and relevance scores. Alternate embodiments may not comprise self-learning features.

In step 440 of the present embodiment, the summary is returned to the system core. In step 450 the system core displays the summary to the user. In step 460 the user can perform various functions such as, but not limited to, save the summary on a local or network drive, print the summary, edit the summary if the system core provides a text editor, and navigate through the search engine to the individual sources. If the user is satisfied at this point, the user may end the process. Otherwise, the user can rate the summary based on criteria such as, but not limited to, satisfaction and quality and pass the feedback to the summarization engine in step 465, or may request a modified summary in step 470. The user may have the option to rate the overall summary, individual text fragments, or the source documents returned by the system in step 465. This feedback may be used by the self-learning feature of the system. The user can also modify parameters such as, but not limited to, the length of the summary, the way references are represented, the sources that should or should not be included in the summary, or any other parameters exposed by the system, by requesting a modified summary in step 470, and the system returns to step 430 to perform another multi-document summarization of the documents using the new parameters.

In an alternate embodiment, a search engine is integrated with the summarization engine into one system. This would enable the system to perform a summarization step on each individual document as the document is added to the data store of the system rather than during the multi-document summarization process. Therefore, the summarization engine in this case does not need to repeat this summarization step in step 430, thus making the whole operation much faster. In this embodiment both the search engine and the summarization engine have access to the documents, for example, without limitation, through a database or file server.

In the alternate embodiment, the system may be implemented without a separate system core. For example, the search engine may be calling the summarization engine, passing the summarization engine the documents. In this case, the search engine implementation would comprise the system core. Alternatively, the summarization engine may be calling the search engine, receiving back the documents to summarize. In this case, the summarization engine implementation would comprise the system core.

The preferred embodiment described above comprises a search engine integrated with a multi-document summarization engine. However, an alternate embodiment of the present invention comprises an Internet directory integrated with a multi-document summarization engine instead of a search engine. An Internet directory comprises a hierarchy of categories that the user browses. At the lower levels of the hierarchy, the user is presented with a list of matching documents or Web pages, which may be processed by the multi-document summarization engine. In this case, steps 400 and 410 of the process previously described are not applicable. Instead, the user browses the Internet directory until he finds a page that contains links to the documents pertinent to his topic of interest. Those links are then passed by the system core in step 420 to the multi-document summarization engine. For example, without limitation, a user who is searching for legal advice in a Web directory for example, without limitation, About.com, navigates down to a particular area of his legal issue, and requests a summary of the documents listed on that level of the directory. The summary serves as an overview of the key concepts related to the user's issue.

Another alternate embodiment of the present invention may be implemented in a question answering system. A question answering system accepts a user's question. The question is then processed by the question answering system, and a number of possible responses or articles are identified. The system then passes the results to a multi-document summarization engine, which produces an overall summary of the results as the answer to the user's question. A knowledge base residing on a computer network, for example, without limitation, the Internet, the Intranet, or a LAN, or on a standalone computer or server may be implemented in another alternate embodiment. The implementation of a knowledgebase is similar to the implementation of a question answering system.

Figure 5:
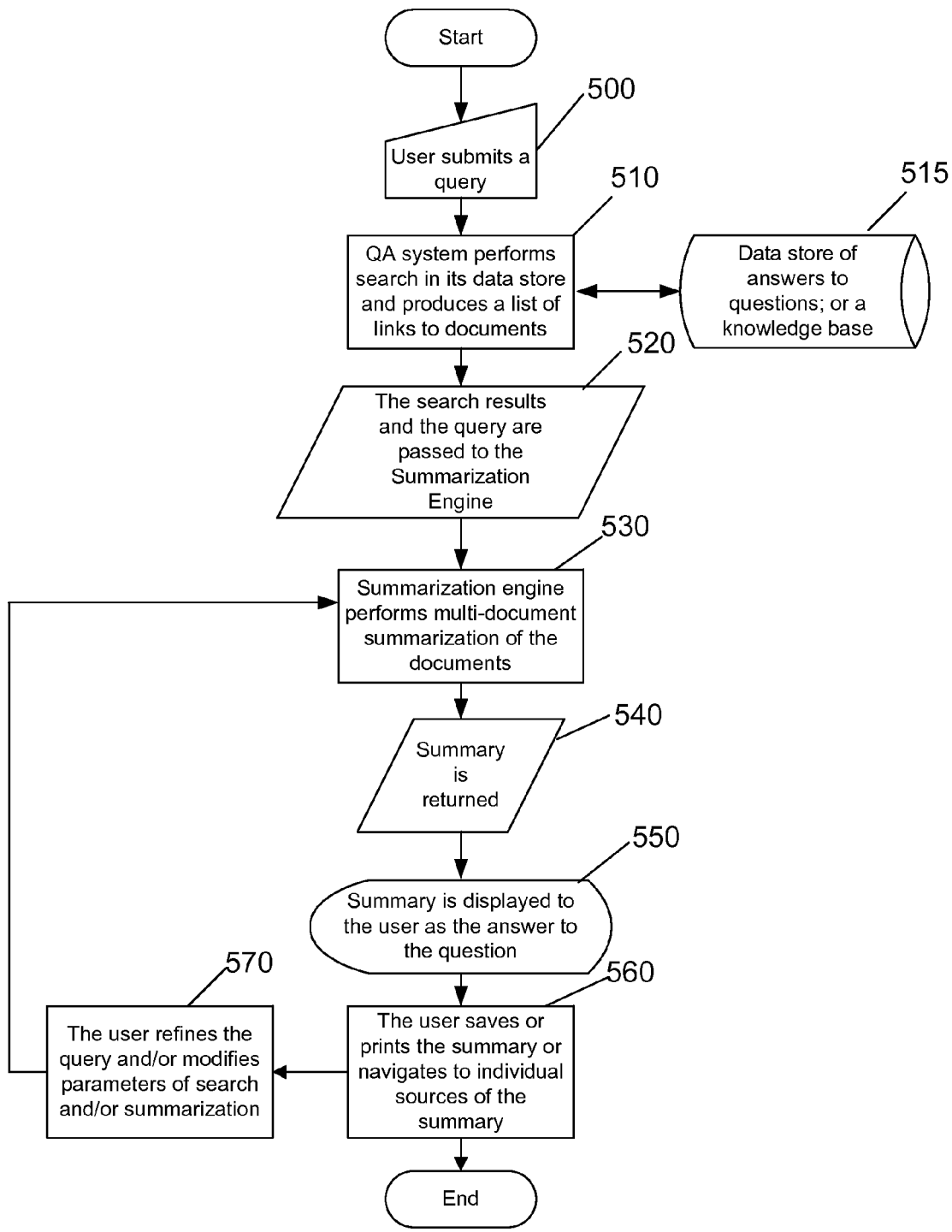
FIG. 5 is a flowchart illustrating an exemplary process for the interaction between a question answering system and a summarization engine, in accordance with an embodiment of the present invention.

FIG. 5 is a flowchart illustrating an exemplary process for the interaction between a question answering system and a summarization engine, in accordance with an embodiment of the present invention. In the present embodiment, a question answering system is used instead of a search engine. The difference is that the question answering system itself performs a search for documents matching the user's query in an answer data store 515 comprising answers to various questions or a knowledgebase then passes the results to the summarization engine and returns the multi-document summary as the answer to the user.

In the present embodiment, the process begins at step 500 where the user submits a query. In step 510 the question answering system performs a search in answer data store 515 and produces a list of links to documents. In step 520 a system core passes the search results and the query to a multi-document summarization engine. In step 530 the multi-document summarization engine performs a multi-document summarization of the results as previously described in accordance with FIG. 4, step 430. The summary is returned to the system core in step 540, and in step 550 the system core displays the summary to the user as an answer to the query. In step 560 the user may save or print the summary or may navigate the individual sources cited in the summary. If the user is satisfied with the summary, the process ends. If the user wishes, the user may refine the query or modify the parameters of the search and/or summarization in step 570. The system then returns to step 530 to perform the multi-document summarization again using the refined query and/or new parameters.

In an alternate embodiment, a computer program installed on a standalone computer or a LAN server calls a search engine via an API. This computer program then receives the links to the documents and passes the links to the summarization engine. Then, the computer program receives the summary from the summarization engine and displays the summary to the user.

In another alternate embodiment, a computer program installed on a mobile communications device calls a server application passing along a query from the user. This server application then passes the query to a search engine and receives links to documents that the search engine finds as results. The application then passes the links to the summarization engine, receives the summary, and returns the summary to the mobile device to display to the user.

In yet another alternate embodiment, an application may be implemented as a computer program running on a standalone computer. In this embodiment, the computer program performs a search on the local computer drives or network drives and summarizes the found search results on the same computer.

In yet another alternate embodiment, a web page or number of web pages comprising a web application calls a search engine and receives back links to documents. Then, the web page passes the links to a summarization engine, receives the summary from the summarization engine, and displays the summary to a user. In another alternate embodiment, a web service rather than a web page may be used to call the web application that interacts with the search engine and summarization engine. In this embodiment, once the web service receives the summary, the web service returns the summary to its caller application to peruse the summary in any desired fashion.

In yet other alternate embodiments, an Internet browser plug-in or add-on may be used. In these embodiments the Internet browser plug-in or add-on may either call on a search engine to receive links to documents or screen-scrape the results of a search on a Web page to receive links to documents. The Internet browser plug-in or add-on then sends the links to a summarization engine, receives back the summary, and displays the summary to a user.

Figure 6:
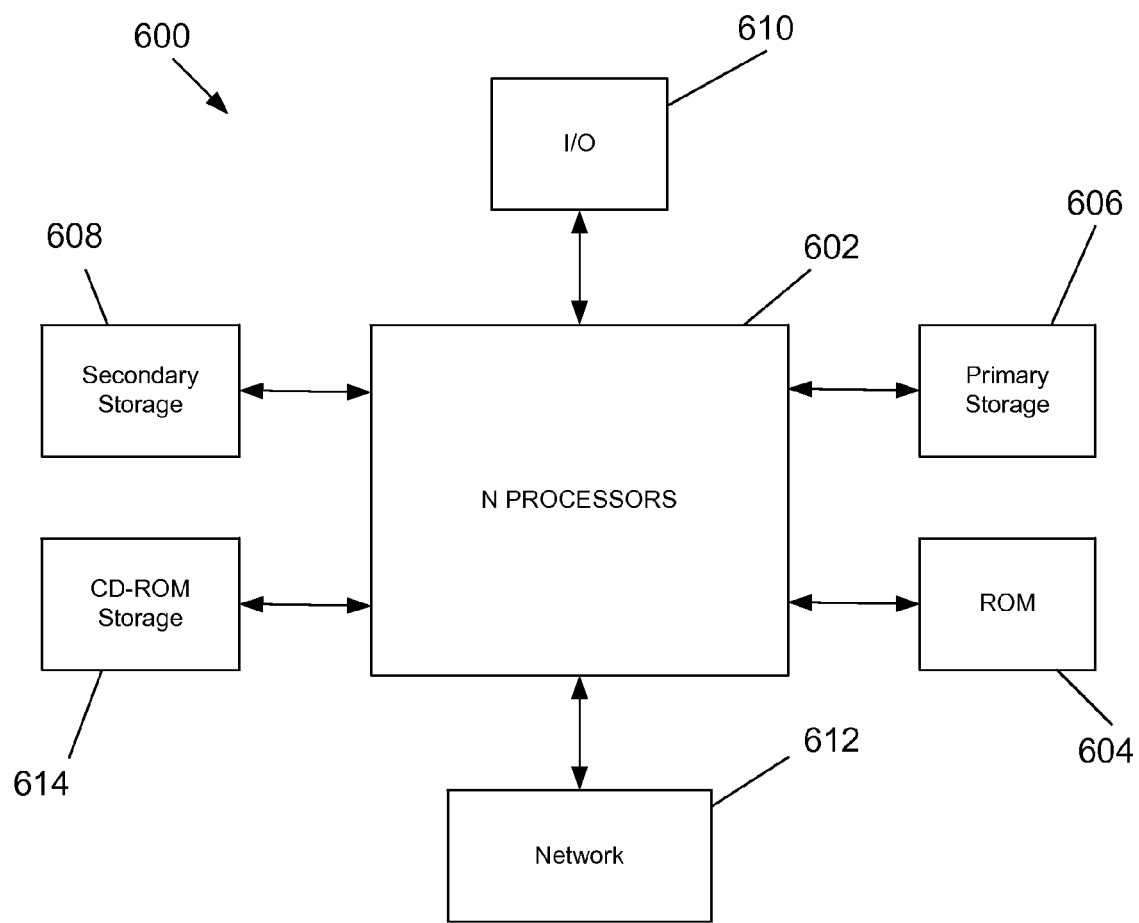
FIG. 6 illustrates a typical computer system that, when appropriately configured or designed, can serve as a computer system in which the invention may be embodied.

FIG. 6 illustrates a typical computer system that, when appropriately configured or designed, can serve as a computer system in which the invention may be embodied. The computer system 600 includes any number of processors 602 (also referred to as central processing units, or CPUs) that are coupled to storage devices including primary storage 606 (typically a random access memory, or RAM), primary storage 604 (typically a read only memory, or ROM). CPU 602 may be of various types including microcontrollers (e.g., with embedded RAM/ROM) and microprocessors such as programmable devices (e.g., RISC or SISC based, or CPLDs and FPGAs) and unprogrammable devices such as gate array ASICs or general purpose microprocessors. As is well known in the art, primary storage 604 acts to transfer data and instructions uni-directionally to the CPU and primary storage 606 is used typically to transfer data and instructions in a bi-directional manner. Both of these primary storage devices may include any suitable computer-readable media such as those described above. A mass storage device 608 may also be coupled bi-directionally to CPU 602 and provides additional data storage capacity and may include any of the computer-readable media described above. Mass storage device 608 may be used to store programs, data and the like and is typically a secondary storage medium such as a hard disk. It will be appreciated that the information retained within the mass storage device 608, may, in appropriate cases, be incorporated in standard fashion as part of primary storage 606 as virtual memory. A specific mass storage device such as a CD-ROM 614 may also pass data uni-directionally to the CPU.

CPU 602 may also be coupled to an interface 610 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to an external device such as a database or a computer or telecommunications or internet network using an external connection as shown generally at 612, which may be implemented as a hardwired or wireless communications link using suitable conventional technologies. With such a connection, it is contemplated that the CPU might receive information from the network, or might output information to the network in the course of performing the method steps described in the teachings of the present invention.

In the foregoing some embodiments are described as generating a multi-document text summary. While it is the text that is typically analyzed by the system in order to generate a coherent document for the user, in some embodiments the multi-document summary may also include a multiplicity of suitable media in addition to or rather than text. In these embodiments, source documents may contain not only text, yet may also include, without limitation, images, videos, audio, and other media formats. These different media formats may also be included, without limitation, into the generated summary. The inclusion of multiple media formats may help to support the user's understanding of the summary with visuals, audio, and other media objects, which may enhance the user's experience. It is contemplated that the logic used to include the media objects may be different in various different embodiments. For example, without limitation, one embodiment may use the metadata accompanying the media objects such as, but not limited to, a title, a description, an author, etc. In another embodiment, the system may analyze the text describing a particular media object, even when such text is not directly a part of the metadata describing the image for example, without limitation, if the text is a user comment or a caption on an image or video, to deem the object relevant to the summary that is being generated by the system. If the system deems the media object relevant, the object is included, without limitation, in the summary, either by itself or alongside other fragment(s) of text or other relevant media objects from the source documents.

In the foregoing a variety of non-limiting examples of approaches to implementing multi-document summarization are described. Those skilled in the art will readily recognize, in light of and in accordance with the teachings of the present invention, that no particular definition of multi-document summarization, whether from research circles or industry-wide, is essential for search systems according to various embodiments of the present invention to operate. Therefore, in relation to this description, multi-document summarization is not a strict term, and rather generally refers to any compilation of text and other meaningful information from more than one source that attempts to deliver a coherent summary to the user.

In one embodiment, a search system may be combined with an Internet service such as, but not limited to, a travel site or a real estate office website to enable a user to obtain information about a hotel, restaurant, town, etc. In this embodiment the system performs a search for information on an object or a multitude of objects being researched, for example, without limitation, hotels, restaurants, real estate areas, attractions, etc. and creates a summary of relevant information from multiple sources such as, but not limited to, Wikipedia, travel sites, newspapers, municipal records, tourists' reviews, etc. Various different types of Internet services may be incorporated into embodiments similar to this such as, but not limited to, retail sites, theater or entertainment rental sites, directories for local service providers, etc.

Some embodiments may be implemented with the ability to learn. In some of these embodiments, the system may learn through explicit feedback by analyzing feedback from the user. Some embodiments may also use automated feedback to tune itself or augments in its dictionaries based upon observing implicit metrics including, without limitation, how much time the user spent reading the summary or whether the user used the summary for further navigation and searches. It is contemplated that in some embodiments various different metrics such as, but not limited to, if the user prints or forwards the summary, if the user creates a shortcut to the summary or how many times the user views any videos or listens to any audio files in the summary, may be defined by various different implementations in which the system can learn automatically and tune its summary generation algorithms accordingly with or without human intervention.

In some embodiments, the query to the system may not be directly entered by the user, but implied by the system based on various considerations, including but not limited to, user preferences, user search history, an advertiser's preferences, a preconfigured query, or some default algorithm that the system implements.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC §112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC §112 (6). In some embodiments, the methods and/or system components which may be located and/or performed remotely include, without limitation: the search engine and the multi-document summarization engine and the processes performed by these components.

It is noted that according to USA law, all claims must be set forth as a coherent, cooperating set of limitations that work in functional combination to achieve a useful result as a whole. Accordingly, for any claim having functional limitations interpreted under 35 USC §112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC §112 (6) is/(are) dependent on one or more remote servers located outside the USA, it is intended that each such recited function under 35 USC §112 (6) is to be interpreted as the function of the local system receiving the remotely generated information required by a locally implemented claim limitation, wherein the structures and or steps which enable, and breathe life into the expression of such functions claimed under 35 USC §112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC §112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of providing multi-document summarization of search results according to the present invention will be apparent to those skilled in the art. The invention has been described above by way of illustration, and the specific embodiments disclosed are not intended to limit the invention to the particular forms disclosed. For example, the particular implementation of the summary may vary depending upon the particular type of layout used. The summaries described in the foregoing were directed to implementations where the summary is a list of sentences or text fragments; however, similar techniques are to layout the summary as a paragraph, a list of bullet points, an outline, etc. Implementations of the present invention with various summary layouts are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. A method comprising the steps of:

sending a query to a system core where said query is passed to a search component for searching documents, said searched documents comprising a plurality of media formats, in which said system core is configured to receive results from said search component that indicate at least one or many related documents of said query;

passing to a summarization component at least a specified number of said received results, wherein said summarization component is configured to generally process said related documents including non-textual media elements corresponding to said specified number of results to substantially produce a multi-document summary, said multi-document summary comprising a digest, on a topic generally specified by said query, produced by analyzing at least syntax, semantics, textual content associated with said related documents and said non-textual media elements;

extracting sentences and text fragments of said related documents, wherein said sentences and text fragments comprising an attached reference link to individual related documents from which said sentences and text fragments has been extracted;

combining said sentences and text fragments with their attached reference links into said digest, in which said system core is configure to received said multi-document summary from said summarization component;

receiving from said system core said multi-document summary for display as a product of said query;

displaying said multi-document summary;

receiving from said system core said results from said search component and displaying said results in addition to displaying said multi-document summary; and extracting and displaying semantic concepts to a user;

enabling said user to use a presentation by said displaying steps to refine said query, to navigate to certain parts of said multi-document summary, to view said related documents by choosing at least one of said attached reference links in said digest, to view at least one of said related documents by choosing at least one of said results from said search component, to request another multi-document summary, to exclude at least one or many sentence fragments from said requested another multi-document summary, to exclude at least one or many related documents from said requested another multi-document summary, to include one or more related documents excluded in said specified number of said multi-document summary results, to choose a display preference for said attached reference links, to modify or regroup the contents of said multi-document summary, to choose a language for said query and said related documents, to substantially organize the contents of said multi-document summary, to save the currently displayed multi-document summary, and to rate said multi-document summary for feedback to said system core based at least on satisfaction and quality.

2. The method as recited in claim 1, further comprising step of sending to said system core parameters for limiting a length of said multi-document summary regardless of said specified number of results.

3. The method as recited in claim 1, further comprising step of sending said rating of said multi-document summary to said system core, wherein said rating is configured as a feedback to a learning process of said summarization component and stored on a content dictionary for a predefined information domain, in which said feedback, in combination with words, phrases or concepts pre-stored in said content dictionary is configured to enable said summarization component to adjust and suit said information domain.

4. The method as recited in claim 1, further comprising step of manipulating said multi-document summary, in which said manipulating step further comprising step for modifying a length of said multi-document summary.

5. A method for searching multiple documents on a computer system comprising:

step for sending a search query to a system core;

step for receiving from said system core at least one multi-document summary, said multi-document summary comprising a plurality of media formats including at least non-textual media elements and a digest on a topic specified by said query for display, said multi-document summary being a result of said search query in which said digest comprising a combination of sentences and text fragments extracted from at least one or more related documents, said combination of sentences and text fragments comprising at least one or many media formats, returned by said query and at least an attached reference link to individual related documents;

step for displaying said multi-document summary;

step for receiving from said system core said results from said search component;

displaying said results in addition to displaying said multi-document summary;

step for extracting and displaying semantic concepts to a user; and step for enabling said user to use a presentation to refine said search query, to navigate to certain parts of said multi-document summary, to view a one of said related documents by choosing a one of said attached reference links, to view a one of said related documents by choosing a one of said results from said search component, to request another multi-document summary, to exclude one or more sentence fragments from said requested another multi-document summary, to exclude one or more related documents from said requested another multi-document summary, to include one or more related documents excluded in said specified number of said results, to choose a display preference for said reference links, to modify or regroup the contents of said multi-document summary, to generally organize the contents of said multi-document summary, to set the language of said query and said related documents, to save the currently displayed multi-document summary and to rate said multi-document summary for feedback to said system core based at least on satisfaction and quality.

6. The method as recited in claim 5, further comprising step for sending to said system core at least one or many parameters for limiting a length of said multi-document summary.

7. The method as recited in claim 5, further comprising step for sending said rating of said multi-document summary to said system core, wherein said rating is operable as a feedback to a learning process of said summarization component and stored on a content dictionary for a predefined information domain, in which said feedback, in combination with words, phrases or concepts pre-stored in said content dictionary is configured to enable said summarization component to adjust and suit said information domain.

8. A system for searching multiple documents on a computer system, the system comprising:

means for interfacing with a user;

means for searching the documents using a query from the user;

means for generating a multi-document summary, said multi-document summary comprising a digest having references to related documents, said multi-document summary further comprising a plurality of media formats including non-textual media elements, from results from said searching means, in which said digest comprising a combination of sentences and text fragments extracted from content associated with said related documents, and wherein each of said sentences and text fragments further comprises an attached reference link to at least one related document from which each has been extracted;

means for presenting said multi-document summary to the user as a product of said query;

means for displaying said multi-document summary;

means for receiving from said system core said multi-document summary from said searching means;

means for extracting and displaying semantic concepts from said multi-document summary;

means for presenting said result in addition to said multi-document summary and said extracted semantic concepts to said user; and means for enabling the user by said presenting means to refine said query, to navigate to certain parts of said multi-document summary, to view at least one of said related documents by choosing at least one attached reference link in said digest, to view at least one of said related documents by choosing at least one result from said searching means, to request another multi-document summary, to exclude one or more sentence fragments from said requested another multi-document summary, to exclude at least one or many related documents from said requested another multi-document summary, to include at least one or many related documents excluded in said specified number of said multi-document summary results, to choose a display preference for said reference links, to modify or regroup the contents of said multi-document summary, to organize the contents of said multi-document summary, to save the currently displayed multi-document summary, and to rate said multi-document summary for feedback to said generating means based at least on satisfaction and quality.

9. The system as recited in claim 8, further comprising means for focusing said multi-document summary on a topic.

10. The system as recited in claim 8, further comprising means for using dictionaries of words or phrases in said generating means for substantially analyzing textual content associated with said multi-document summary, in which said manipulating step further comprising step for modifying a length of said multi-document summary.

11. The system as recited in claim 8, further comprising means for selecting a language of said query and said related documents.

12. The system as recited in claim 8, further comprising means for said user to generally obtain a source document from said multi-document summary.

13. The system as recited in claim 8, further comprising means for selecting results to generally pass to said generating means.

14. The system as recited in claim 8, further comprising means for specifying parameters of said multi-document summary.

15. The system as recited in claim 8, further comprising means for scoring a relevance of semantic concepts when generating said multi-document summary.

16. The system as recited in claim 8, further comprising means for manipulating said multi-document summary.

17. The system as recited in claim 8, further comprising means for sending said rating of said multi-document summary to said generating means, wherein said rating is configured as a feedback to a learning process and stored on a content dictionary for a predefined information domain, in which said feedback, words, phrases and concepts pre-stored in said content dictionary is configured to enable said summarization component to adjust and suit said information domain.

18. The system as recited in claim 8, further comprising means for integrating said searching means and said generating means.

* * * * *